(12) United States Patent
Murakami et al.

(10) Patent No.: US 8,794,685 B2
(45) Date of Patent: Aug. 5, 2014

(54) ROBOT HAND AND ROBOT

(75) Inventors: Kenjiro Murakami, Matsumoto (JP); Kazuto Yoshimura, Suwa (JP); Yoshinobu Goto, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/468,435

(22) Filed: May 10, 2012

(65) Prior Publication Data

US 2012/0286535 A1    Nov. 15, 2012

(30) Foreign Application Priority Data

May 11, 2011    (JP) .................................. 2011-105931

(51) Int. Cl.
*B25J 15/08*    (2006.01)

(52) U.S. Cl.
USPC ........................... 294/119.1; 294/213; 901/39

(58) Field of Classification Search
USPC ................. 294/2, 86.4, 207, 213, 106, 119.1; 901/31, 36, 39; 623/57, 64
See application file for complete search history.

(56) References Cited

U.S. PATENT DOCUMENTS

| | | | | |
|---|---|---|---|---|
| 3,069,761 | A * | 12/1962 | Sommer | 294/106 |
| 3,306,646 | A * | 2/1967 | Flora, Jr. | 294/2 |
| 4,273,506 | A * | 6/1981 | Thomson et al. | 294/106 |
| 4,479,673 | A * | 10/1984 | Inaba et al. | 294/207 |
| 4,621,853 | A * | 11/1986 | Fink | 294/203 |
| 4,623,183 | A * | 11/1986 | Aomori | 294/86.4 |
| 4,653,793 | A * | 3/1987 | Guinot et al. | 294/86.4 |
| 4,984,951 | A | 1/1991 | Jameson | |
| 6,244,644 | B1 | 6/2001 | Lovchik et al. | |
| 6,264,419 | B1 | 7/2001 | Schinzel | |
| 6,665,919 | B1 * | 12/2003 | Kurtz et al. | 29/262 |
| 7,370,896 | B2 * | 5/2008 | Anderson et al. | 294/106 |
| 8,403,387 | B2 * | 3/2013 | Nakasugi et al. | 294/2 |
| 2003/0090115 | A1 | 5/2003 | Kim et al. | |
| 2006/0012197 | A1 | 1/2006 | Anderson et al. | |
| 2008/0023925 | A1 | 1/2008 | Tomita et al. | |
| 2010/0171332 | A1 * | 7/2010 | Geary et al. | 294/88 |
| 2012/0175904 | A1 | 7/2012 | Murakami et al. | |
| 2012/0290133 | A1 * | 11/2012 | Goto et al. | 294/213 |

FOREIGN PATENT DOCUMENTS

| | | |
|---|---|---|
| JP | 59-156642 | 9/1984 |
| JP | 02-106516 | 4/1990 |
| JP | 05-192887 | 8/1993 |
| JP | 05-220687 | 8/1993 |
| JP | 06-024517 | 2/1994 |
| JP | 6-30862 | 4/1994 |
| JP | 06-190771 | 7/1994 |
| JP | 06-328383 | 11/1994 |
| JP | 07-205080 | 8/1995 |

(Continued)

*Primary Examiner* — Paul T Chin
(74) *Attorney, Agent, or Firm* — Harness, Dickey & Pierce, P.L.C.

(57) ABSTRACT

A robot hand includes a palm section provided between a plurality of finger sections. The palm section may be brought into contact with an object while the object is gripped by the finger sections. The robot hand also includes a contact member that is detachably mounted on the palm section. The contact member may be brought into contact with the object instead of the palm section. Accordingly, even if an object is too small to be contacted by the palm section, it is possible to stably grip the small object since the contact member can be brought into contact with the object gripped by the finger sections instead of the palm section.

16 Claims, 8 Drawing Sheets

(56) References Cited

FOREIGN PATENT DOCUMENTS

| JP | 09-150384 | 6/1997 |
|----|-----------|--------|
| JP | 2000-117677 | 4/2000 |
| JP | 2001-009768 | 1/2001 |
| JP | 2002-080126 | 3/2002 |
| JP | 2006-168786 | 6/2006 |
| JP | 2007-118148 | 5/2007 |
| JP | 2007-139360 | 6/2007 |
| JP | 2010-131735 | 6/2010 |
| JP | 2010-201538 | 9/2010 |

* cited by examiner

ROBOT HAND AND ROBOT

BACKGROUND

1. Technical Field

The present invention relates to a robot hand capable of grasping an object.

2. Related Art

In the past, robots which perform work such as welding or painting have been utilized during the manufacture of industrial products. Nowadays, robots are installed on assembly lines of industrial products and the robots automatically assemble various components regarding the product on the line. As such, improvement in production efficiency is widely realized.

A typical robot which is installed on the assembly line deals with objects having various sizes or shapes. For this reason, in the portion (a robot hand) of the robot which grips the object, high versatility is required to enable gripping and assembling of various objects. Therefore, robot hands capable of gripping components having various sizes or shapes have been proposed (see JP-A-2010-201538 and JP-A-5-220687).

However, in the robot hands which have been proposed, there is a problem in that it is difficult to stably grip small objects. That is, in these robot hands, an object is gripped between plural finger sections provided to face each other on a palm section. At this time, if the object is relatively large, the object gripped by the finger sections comes into contact with the palm section, so that the object is also supported by the palm section, thereby providing stable gripping. In contrast, in the case of gripping a relatively small object, the object gripped by the finger sections is only held by the finger sections without touching the palm section. Of course, if the finger sections are strongly pressed against the object, the object can be stably gripped. However, since there is concern that the surface of the object may be scratched, there is a limit to the effectiveness of this approach. For this reason, there is a problem in that it is difficult to stably grip a small object.

SUMMARY

An advantage of some aspects of the invention is that it provides a robot hand capable of stably gripping small objects.

An aspect of the invention is directed to a robot hand including: a plurality of finger sections which grip an object; and a palm section provided between the plural finger sections, wherein a mounting portion is provided in the palm section and a contact member that comes into contact with the object is detachably mounted to the mounting portion.

In the robot hand according to the above aspect of the invention, the object is gripped by the plurality of finger sections. At this time, if the object gripped by the plurality of finger sections comes into contact with the palm section, the object is stably gripped by the finger sections and the palm section. Further, in the case of gripping an object (for example, a small object) which the palm section cannot come into contact with, the contact member is mounted on the palm section, so that instead of the palm section, the contact member is brought into contact with the object. In this way, it becomes possible to broaden the range of objects which the robot hand can stably grip since even objects that the palm section cannot come into contact with can be stably gripped.

In the robot hand according to the above aspect of the invention, the palm section may be provided so as to be able to move toward the object gripped by the finger sections.

According to the above configuration, it is possible to move the palm section in accordance with the size of an object to be gripped or a position where an object is gripped. Therefore, it becomes possible to more stably grip the object by the finger sections and the palm section (or the contact member mounted on the palm section).

In the robot hand according to the above aspect of the invention, a concave portion may be provided in the portion of the contact member, which comes into contact with the object.

According to the above configuration, for example, when the object has been gripped, a portion of the object is fitted into the concave portion, whereby it is possible to regulate movement of the object. Therefore, for example, it becomes possible to stably grip an object (for example, a thin plate-like object) having a shape which is difficult to grip so that it does not shake.

Further, the robot hand according to the above aspect of the invention can stably grip various objects with a simple structure and control. Therefore, if a robot is constituted by using the robot hand according to the above aspect of the invention, it becomes possible to obtain a robot having high versatility while structure and control are simple.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the following, in order to clarify the contents of the invention described above, examples will be described according to the following order.
A. Structure of Robot Hand related to this Example
B. Gripping Operation of Robot Hand related to this Example
C. Modification Examples C-1. First Modification Example
C-2. Second Modification Example
C-3. Third Modification Example

A. Structure of Robot Hand Related to this Example

Figure 1A:
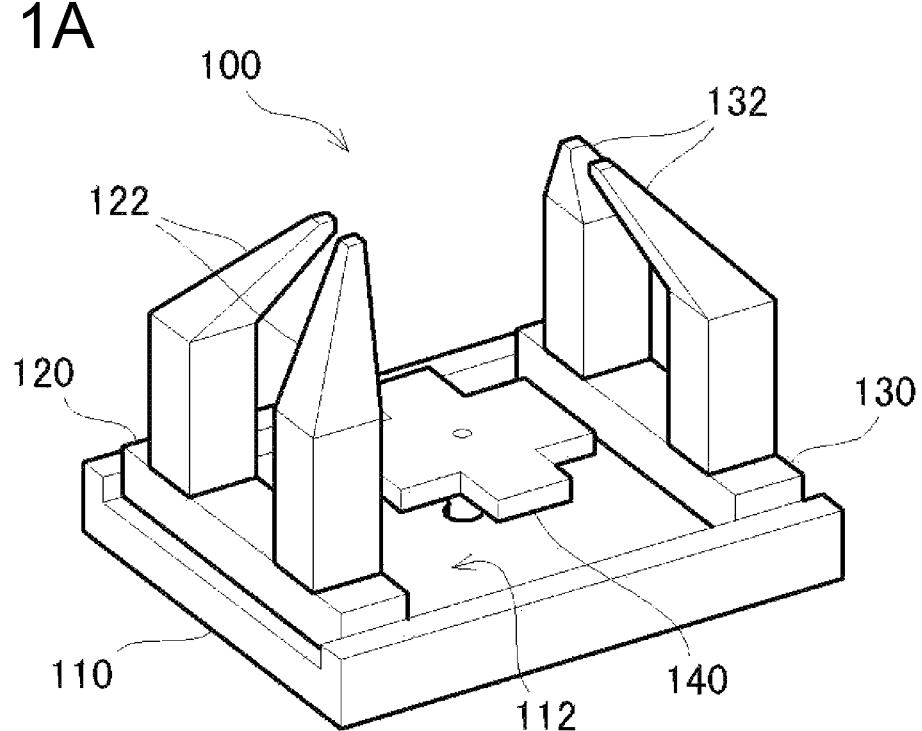
FIGS. 1A and 1B are explanatory diagrams showing the structure of a robot hand related to an example.
Figure 1B:
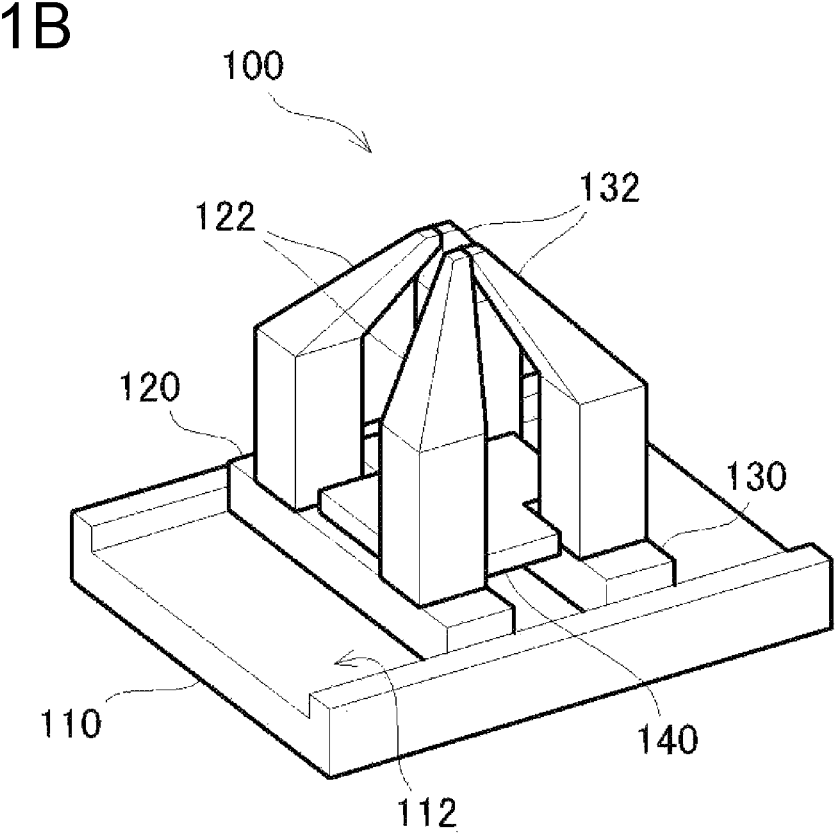

FIGS. 1A and 1B are explanatory diagrams showing the structure of a robot hand 100 related to this example. As shown in the drawings, the robot hand 100 related to this example is largely composed of three sections. A foundation section of the robot hand 100 is composed of a base 110 with a large guide groove 112 formed in the rectangular top surface thereof, a palm section 140 having a flat plate shape and provided approximately at the central position of the guide groove 112, and the like.

Further, at the left and right positions of the base 110 on the drawing, movement members 120 and 130 each having an approximately rectangular parallelepiped shape are provided, and two finger sections 122 are provided on the top surface of the movement member 120, and two finger sections 132 are provided on the top surface of the movement member 130. Both the movement member 120 and the movement member 130 are fitted into the guide groove 112 of the base 110 and slide in a direction in which they approach each other or in a direction in which they retract from each other, by a movement mechanism (not shown). In the robot hand 100 related to this example, a configuration is made such that if the movement member 120 and the movement member 130 are separated from each other by the movement mechanism (not shown), a distance between each finger section 122 and each finger section 132 widens, as shown in FIG. 1A, and conversely, if the movement member 120 and the movement member 130 approach each other, a distance between each finger section 122 and each finger section 132 narrows, as shown in FIG. 1B. Further, in the robot hand 100 related to this example, the palm section 140 provided at the center of the base 110 is made so as to be able to move as follows.

Figure 2A:
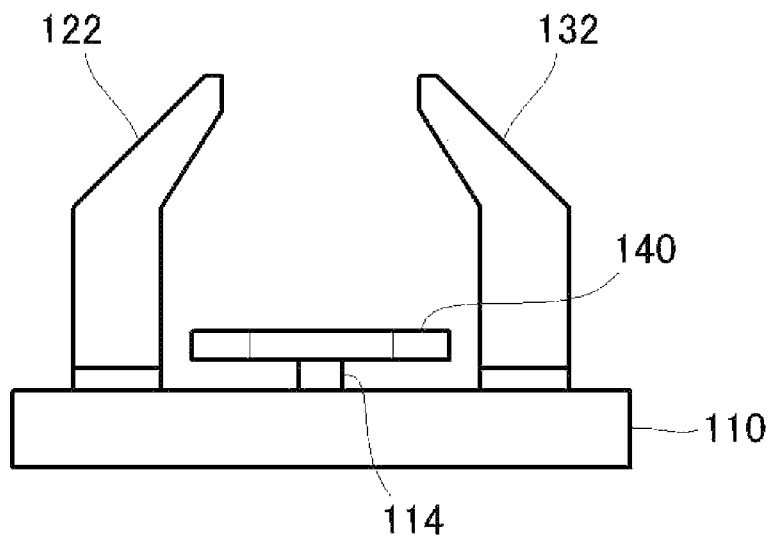
FIGS. 2A and 2B are explanatory diagrams showing movement of a palm section of the robot hand.
Figure 2B:
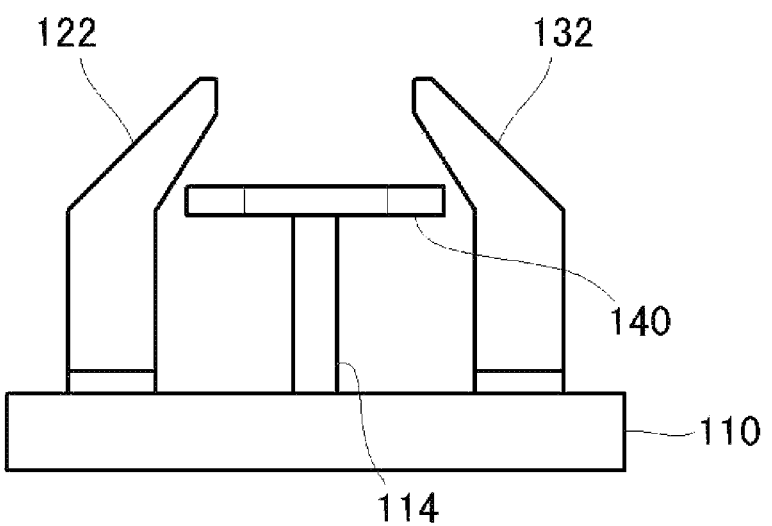

FIGS. 2A and 2B are explanatory diagrams showing movement of the palm section 140 of the robot hand 100 related to this example. In FIGS. 2A and 2B, the appearance of the robot hand 100 shown in FIGS. 1A and 1B when viewed from the front side is shown. As shown in FIG. 2A, the palm section 140 of the robot hand 100 is accommodated at a position close to the bases of the finger sections 122 and 132 in a state where it is supported on a support bar 114 provided to rise up from the center of the base 110. Further, the support bar 114 moves in the up-and-down direction on the plane of paper of the drawing by a lifting and lowering mechanism (not shown) inside the base 110, so that the palm section 140 can be moved up and down by driving the lifting and lowering mechanism. In FIG. 2B, a state where the palm section 140 has been moved to the leading end side of the finger sections 122 and 132 is shown.

B. Gripping Operation of Robot Hand Related to this Example

Figure 3:
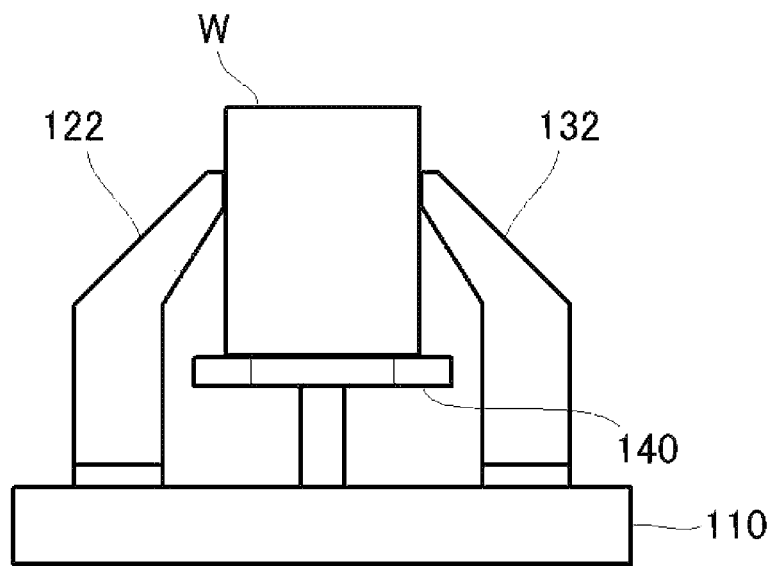
FIG. 3 is an explanatory diagram showing a state where the robot hand related to this example grips an object.

FIG. 3 is an explanatory diagram showing a state where the robot hand 100 related to this example grips an object. In FIG. 3, a state where the robot hand 100 grips a relatively large object W is shown. As shown in the drawing, in a case where the robot hand 100 grips the object W, the object W is grasped by narrowing the distance between the finger sections 122 and 132 and also the palm section 140 moves to the leading end side of the finger sections 122 and 132, thereby being brought into contact with the object W. At this time, the palm section 140 may be brought into contact with the object W after the object W is grasped by the finger sections 122 and 132, and conversely, the object W may be grasped by the finger sections 122 and 132 after the palm section 140 is brought into contact with the object W. Alternatively, an operation to grasp the object W by the finger sections 122 and 132 and an operation to bring the palm section 140 into contact with the object W may also be performed at the same time.

In this manner, in the robot hand 100 related to this example, since the palm section 140 is provided to be movable, the object W can not only be grasped by the finger sections 122 and 132, but also supported by the palm section 140. Therefore, compared to a case where the object W is gripped only by the finger sections 122 and 132, it becomes possible to stably grip the object W. However, in the case of gripping a small object W, as described below, there is a case where it becomes difficult to support the object W by the palm section 140.

Figure 4:
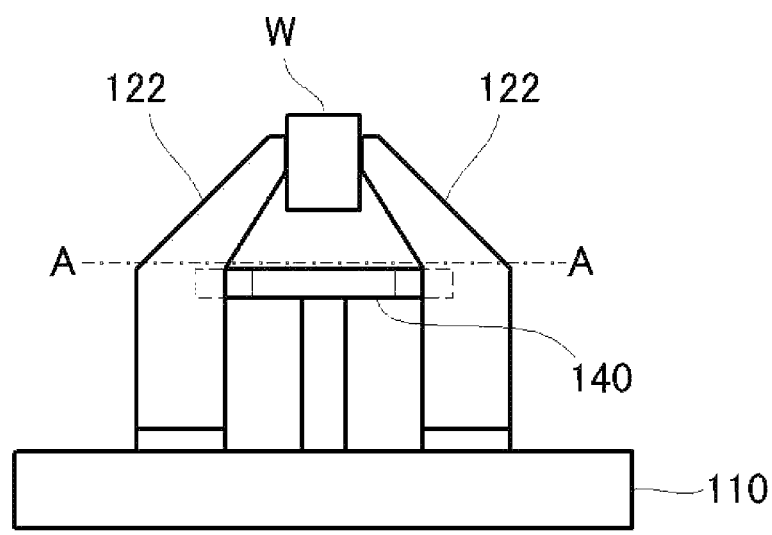
FIG. 4 is an explanatory diagram showing that when a robot hand grips a small object, it becomes difficult to bring a palm section into contact with the object.

FIG. 4 is an explanatory diagram showing that when the robot hand 100 grips the small object W, it becomes difficult to bring the palm section 140 into contact with the object W. As shown in the drawing, in the case of gripping the small object W, since the object W is held in the vicinity of the leading ends of the finger sections 122 and 132, in order to bring the palm section 140 into contact with the object W, there is a need to move the palm section 140 up to the vicinity of the leading ends of the finger sections 122 and 132. Here, since the finger sections 122 and 132 of the robot hand 100 related to this example are formed in a shape in which the leading ends converge toward the central axis of the robot hand 100 (refer to FIGS. 1A and 1B), if the palm section 140 is moved, the palm section 140 interferes with the finger sections 122 and 132 before the palm section 140 comes into contact with the object W. As a result, it does not become possible to bring the palm section 140 into contact with the object W. In addition, in FIG. 4, a position where movement of the palm section 140 is limited due to interference of the palm section 140 with the finger sections 122 and 132 is shown by a line segment A-A. Therefore, in the robot hand 100 related to this example, in the case of gripping the small object W, after a member as described below is mounted in the robot hand 100, an operation to grip the object W is performed.

Figure 5:
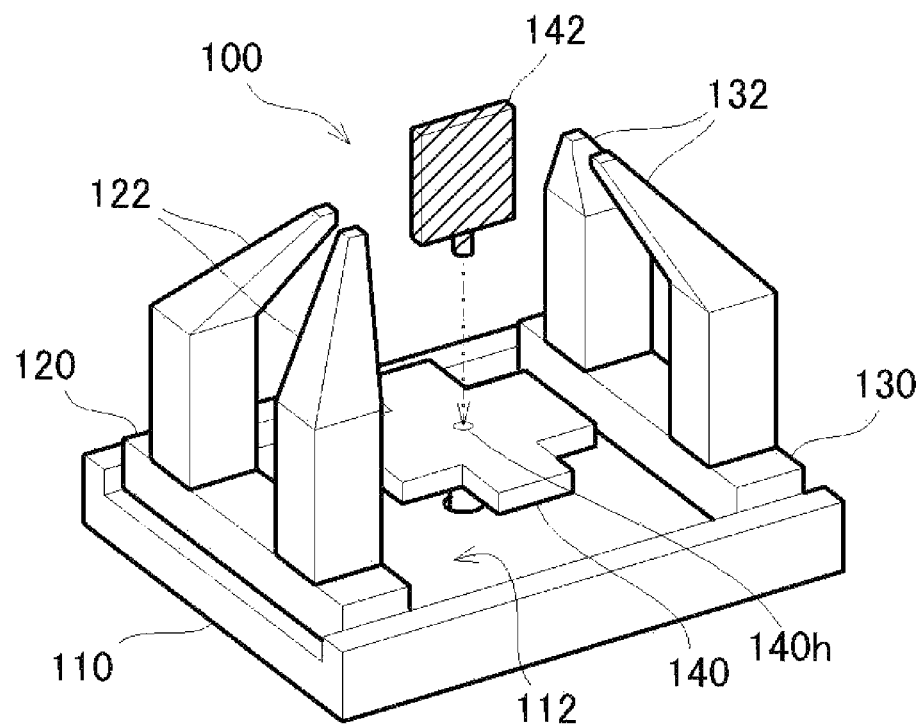
FIG. 5 is an explanatory diagram showing a state where a support member is mounted on the palm section of the robot hand in order to grip a small object.

FIG. 5 is an explanatory diagram showing a state where a support member 142 is mounted on the palm section 140 of the robot hand 100 in order to stabilize the gripping of the small object W. As shown in the drawing, a small mounting hole 140*h* (a mounting portion) is provided at the central position of the palm section 140 of the robot hand 100 related to this example. Then, in the case of gripping the small object W by the robot hand 100, the support member 142 is mounted on the palm section 140 by inserting a convex portion (a projection) of the support member 142 (a contact member) having a thin plate shape into the mounting hole 140*h*.

Figure 6:
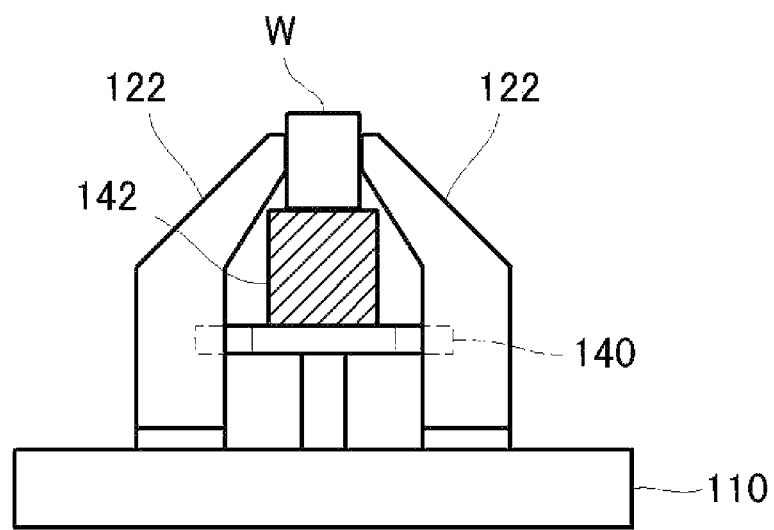
FIG. 6 is an explanatory diagram showing a state where the robot hand related to this example in which the support member is mounted on the palm section grips a small object.

FIG. 6 is an explanatory diagram showing a state where the robot hand 100 related to this example in which the support member 142 is mounted on the palm section 140 grips the small object W. As shown in the drawing, since the support member 142 is mounted on the palm section 140, if the palm section 140 is moved to the leading end side of the finger sections 122 and 132 in a state where the small object W is grasped by the finger sections 122 and 132, the support member 142 comes into contact with the object W before the palm section 140 interferes with the finger sections 122 and 132. As a result, the small object W can be supported by the support member 142, and it becomes possible to stably grip the object W by the finger sections 122 and 132 and the support member 142. Further, the support member 142 in this example is formed into the shape of a thin plate (refer to FIG. 5), as described above, and this is due to the following reasons.

Figure 7A:
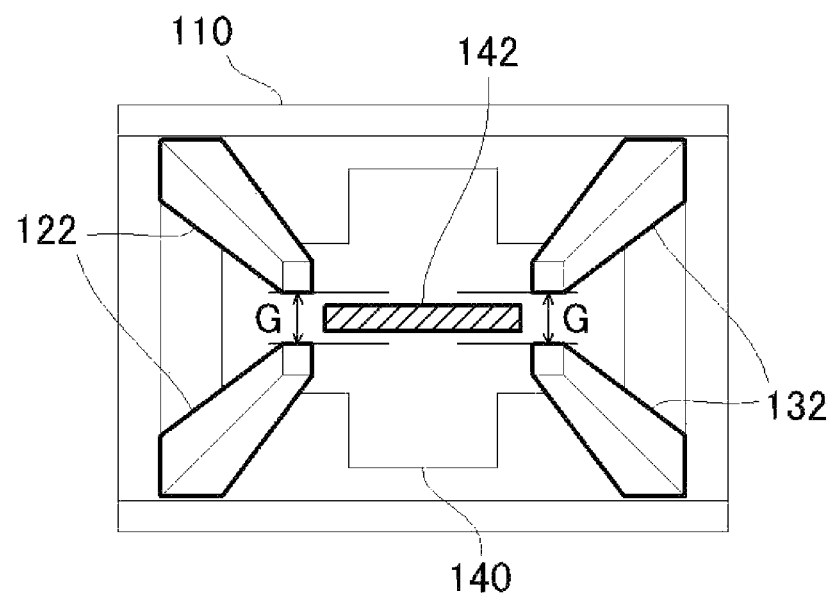
FIGS. 7A and 7B are explanatory diagrams showing that the support member is formed into the shape of a thin plate.
Figure 7B:
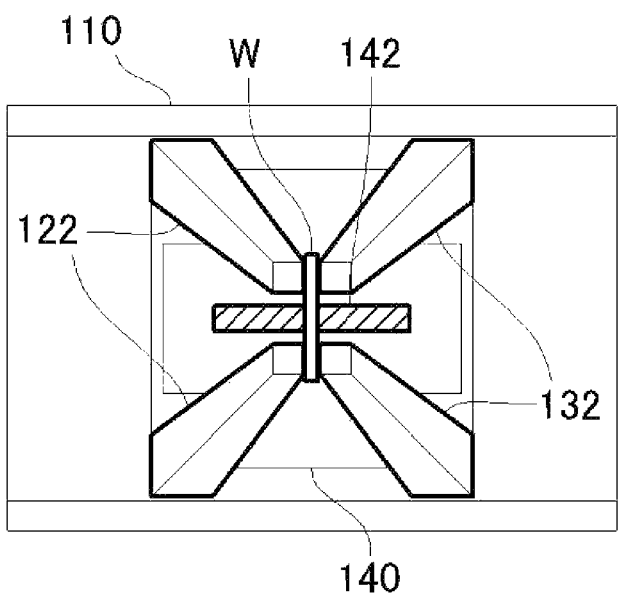

FIGS. 7A and 7B are explanatory diagrams showing that the support member 142 in this example is formed into the shape of a thin plate. In addition, in FIGS. 7A and 7B, the appearance of the robot hand 100 when viewed from above the base 110 is shown (a plan view). As shown in FIG. 7A, in the robot hand 100 related to this example, slight gaps G are respectively provided between the two finger sections 122 provided on the movement member 120 and between the two finger sections 132 provided on the movement member 130. Further, the support member 142 is formed into the shape of a thin plate having a thickness smaller than the gap G and is provided at a position where it is fitted into the gap G. For this reason, even if the finger sections 122 and 132 are moved in the left-and-right direction on the drawing in any way, the finger sections 122 and 132 do not interfere with the support member 142, and even if the support member 142 is moved to some extent in a direction from the back of the drawing to the front, the support member 142 does not interfere with the finger sections 122 and 132. Therefore, for example, as shown in FIG. 7B, even if the distance between each finger section 122 and each finger section 132 is considerably narrowed to grip a very thin object W, it is still possible to bring the support member 142 into contact with the object W without the support member 142 interfering with the finger sections 122 and 132. As a result, it becomes possible to stably grip such an object W by the finger sections 122 and 132 and the support member 142.

C. Modification Examples

Some modification examples are conceivable regarding the example described above. In the following, these modification examples will be briefly described. In addition, in the modification examples which are described below, the same constituent sections as those in the example described above are denoted by the same reference numerals as in the example and a detailed description thereof is omitted.

C-1. First Modification Example

In the robot hand 100 related to the example described above, the support member 142 has been described as being formed into the shape of a thin plate. Here, it is acceptable if the support member is a member having a certain degree of height such that the palm section 140 can come into contact with the object W before it interferes with the finger sections 122 and 132, and, for example, a member having a shape as described below may also be used for the support member.

Figure 8A:
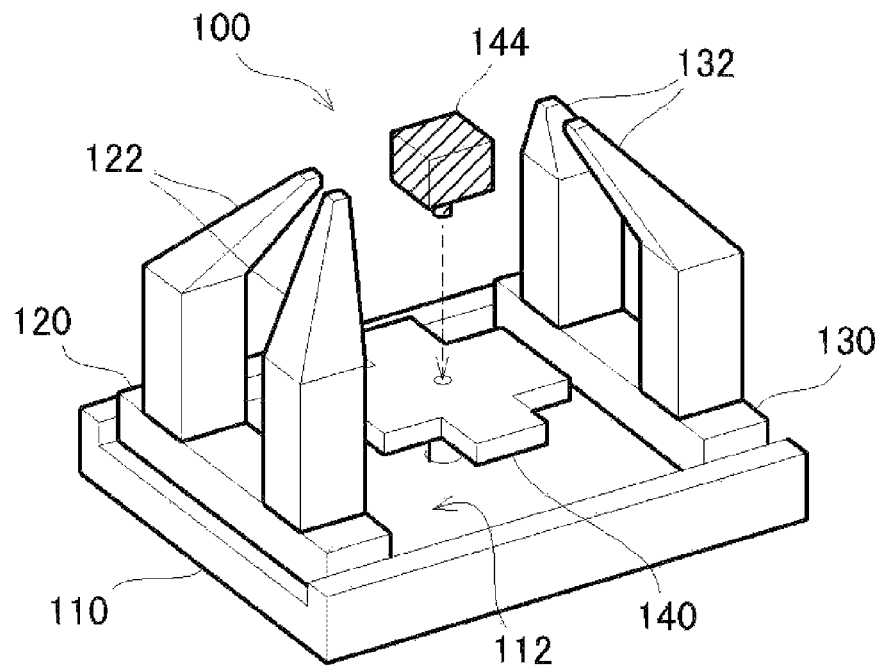
FIGS. 8A and 8B are explanatory diagrams showing the shape of a support member which is mounted on a palm section of a robot hand related to a first modification example.
Figure 8B:
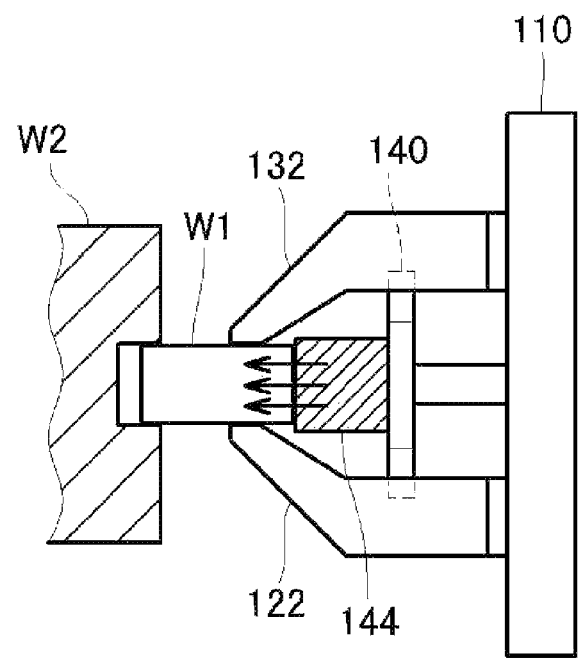

FIGS. 8A and 8B are explanatory diagrams showing the shape of a support member which is mounted on the palm section 140 of a robot hand 100 related to a first modification example. As shown in FIG. 8A, a support member 144 in the first modification example is formed into the shape of a cube.

If the support member 144 is formed into the shape of a cube in this manner, since a contact area with the object W can be increased compared to the above-described support member 142 (refer to FIG. 5) having a thin plate shape, it is possible to more stably support the object W with the support member 144. Further, the contact area with the object W increases, whereby a reactive force that the object W receives from the support member 144 can be dispersed over a large area. Therefore, for example, as shown in FIG. 8B, in the case of performing work to press-fit a gripped object W1 into another object W2, even if the object W1 is pressed against the support member 144, it is possible to suppress damage to the object W due to a large force locally acting thereon. Further, even if the object W is only gripped, the object W tries to move toward the support member 144 by its own weight, whereby the object W can receive a reactive force from the support member 144. However, the contact area with the object W is increased, whereby damage to the object W due to such a reactive force can be similarly suppressed.

C-2. Second Modification Example

In the robot hands 100 related to the example and the first modification example described above, the top surface (that is, a surface which comes into contact with the object W) of the support member has been described as being flat (planar). However, a recessed or cutout structure as described below may also be provided in the portion of the support member which comes into contact with the object W.

Figure 9:
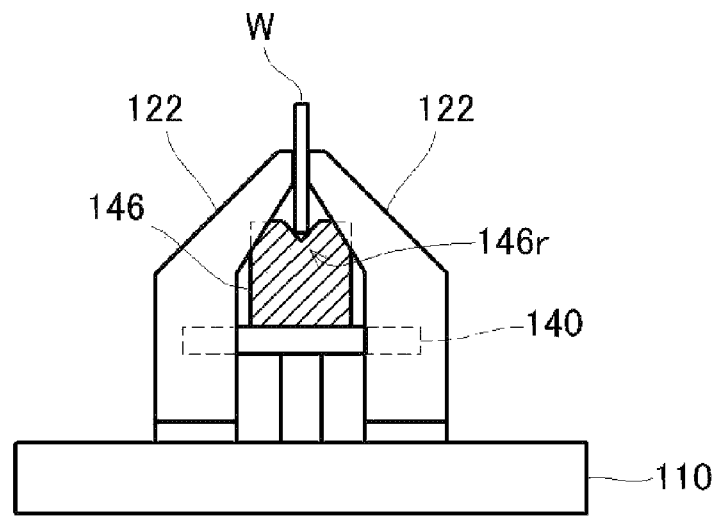
FIG. 9 is an explanatory diagram showing the shape of a support member of a robot hand related to a second modification example.

FIG. 9 is an explanatory diagram showing the shape of a support member of a robot hand 100 related to a second modification example. A support member 146 in the second modification example shown has a small cutout 146r provided in the top surface of the support member 146 having a thin plate shape. In addition, although in FIG. 9, the support member 146 having a thin plate shape is shown, the shape of the support member is not limited to a thin plate shape and a cutout may also be provided in the top surface of the support member 144 having a cubic shape, as previously described using FIGS. 8A and 8B, for example.

If the cutout 146r is provided in the top surface of the support member 146 in this manner, as shown in FIG. 9, a portion of the object W is fitted into the cutout 146r, whereby shaking of the object W can be prevented. As a result, it becomes possible to more stably grip the object W.

C-3. Third Modification Example

In the second modification example described above, a description of preventing shaking of the object W by providing a cutout in the support member has been provided. Here, in a case where the object W gripped by the robot hand 100 moves by an external force, in addition to a case where the object W shakes, a case where an object W having a rotating body shape rotates between the finger sections 122 and 132 is assumed. For the purpose of preventing rotation of such an object W, the support member may also be formed as follows.

Figure 10:
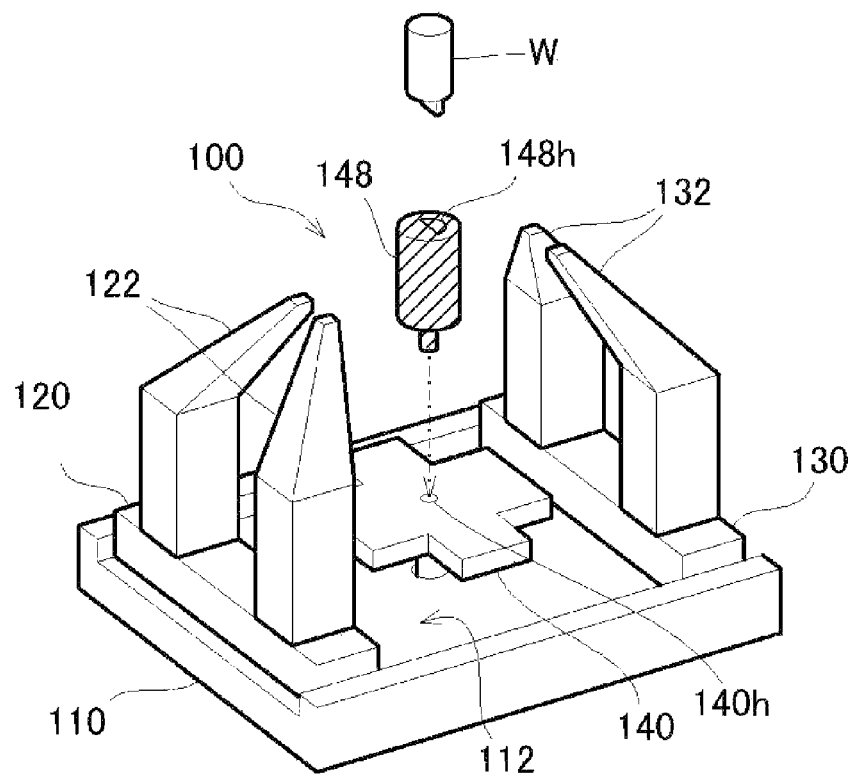
FIG. 10 is an explanatory diagram showing the shape of a support member of a robot hand related to a third modification example.

FIG. 10 is an explanatory diagram showing the shape of a support member of a robot hand 100 related to a third modification example. In addition, in FIG. 10, a case is shown where as one example of the object having a rotating body shape, a cylindrical object W is gripped. In a support member 148 in the third modification example shown, a half-moon-shaped concave portion 148h is provided in the top surface thereof. Further, at one end of the cylindrical object W which is to be gripped by the robot hand 100, a half-moon-shaped convex portion (projection) capable of being fitted into the concave portion 148h of the support member 148 is provided. In addition, with respect to the shape of the concave portion 148h of the support member 148 (and the shape of the convex portion of the object W), it is acceptable if it is a shape capable of regulating rotation of the object W in a state where the convex portion is fitted into the concave portion 148h, and it does not necessarily have to be a half-moon shape.

If the support member 148 and the object W are formed in this manner, it is possible to regulate rotation of the object W by grasping the object W by the finger sections 122 and 132 in a state where the position of the convex portion of the object W corresponds to the position of the concave portion 148h of the support member 148 and then fitting the object W and the support member 148 to each other in this state. Further, although in FIG. 10, the case of gripping the cylindrical object W is illustrated, it is not limited to a cylindrical shape, and in a case where the robot hand 100 grips the object having a rotating body shape, it is possible to regulate rotation of the object W in the same manner. Therefore, it becomes possible to stably grip the object W having a rotating body shape by the finger sections 122 and 132 and the support member 148.

Although the robot hands related to various examples have been described above, the invention is not limited to the example and the modification examples described above and can be implemented in various aspects within a scope which does not depart from the gist thereof. For example, in the robot hands related to the example and the modification examples described above, a description has been given in which two finger sections provided on the same movement member approach or separate from one another in one direction as a set. However, the finger members may also be made such that two finger sections facing each other constitute a set, thereby approaching or separating from each other in a direction approximately orthogonal to the one direction described above.

Figure 11:
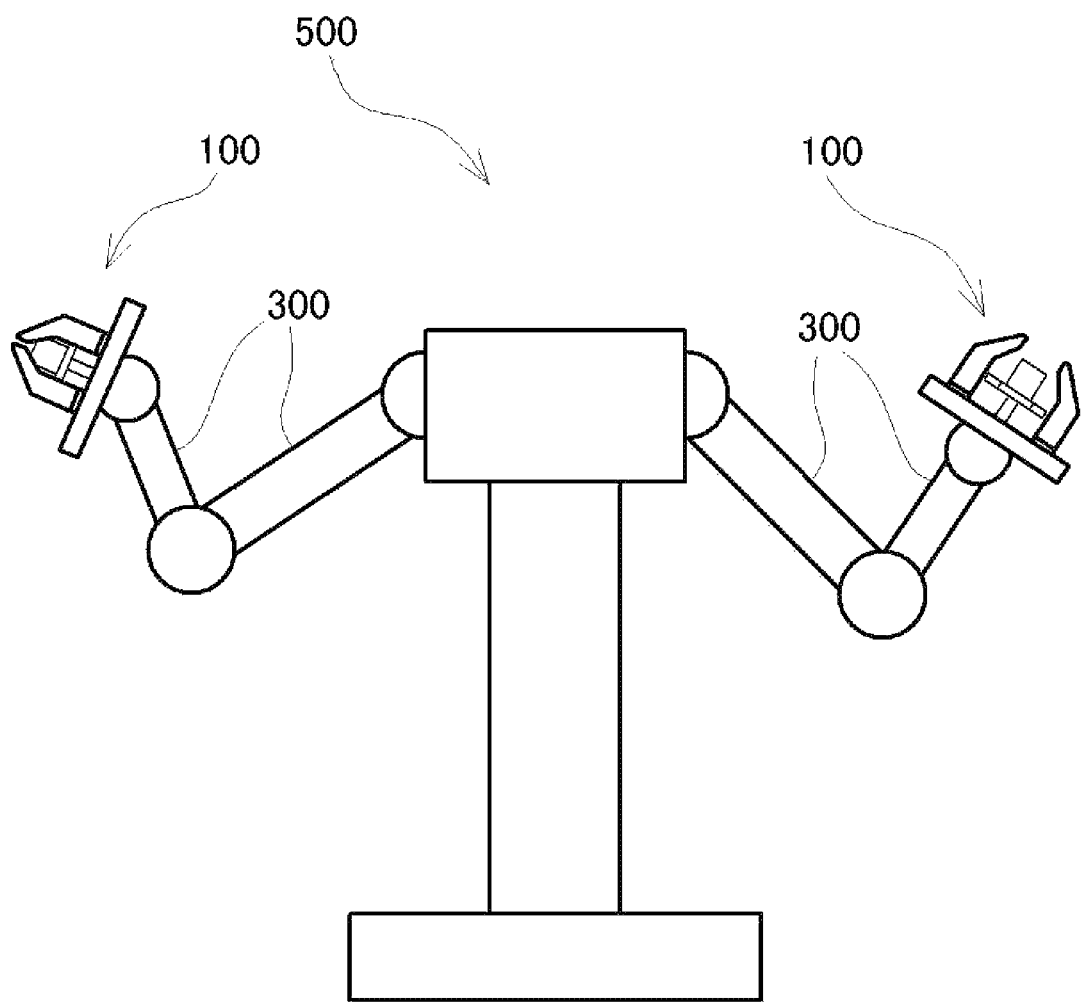
FIG. 11 is an explanatory diagram showing a robot provided with the robot hand.

Further, the robot hands related to the example and the modification examples described above can grip various objects with simple structure and control. Therefore, as shown in FIG. 11, if a robot 500 is constituted by mounting the robot hands on the leading ends of robot arms 300, it becomes possible to obtain the robot 500 having high versatility while the structure and control are kept simple.

The entire disclosure of Japanese Patent Application No. 2011-105931 filed May 11, 2011 is expressly incorporated by reference herein.

What is claimed is:

1. A robot hand comprising:
a plurality of finger sections which grip an object;
a palm section provided between the plurality of finger sections;
a base on which the plurality of finger sections and the palm section are provided; and
a mounting portion provided in the palm section,
wherein a contact member that contacts the object is detachably mounted on the mounting portion, and the contact member is smaller than the palm section as viewed from a mounting direction of the contact member,
each of the plurality of finger sections is respectively located at each of four corners of the base, and
each of the plurality of finger sections is configured with a straight part extending from the base and an angled part extending from the straight part.

2. The robot hand according to claim 1,
wherein the palm section is movably provided so as to be moveable toward the object gripped by the finger sections.

3. A robot comprising the robot hand according to claim 2.

4. The robot hand according to claim 1,
wherein the contact member has a concave portion which contacts the object.

5. A robot comprising the robot hand according to claim 4.

6. A robot comprising the robot hand according to claim 1.

7. The robot hand according to claim 1, wherein
the plurality of finger sections are able to move mutually and horizontally.

8. The robot hand according to claim 1, wherein
the mounting portion is a mounting hole located in a center of the palm section, and
the contact member is in a plate-like shape with a connection part that connects to the mounting hole.

9. The robot hand according to claim 1, wherein
a cutout is formed at a top surface of the contact member, and
the cutout contacts the object.

10. The robot hand according to claim 1, wherein
a half-moon-shaped concave portion is formed in a top surface of the contact member, and
a half-moon-shaped convex portion of the object is fitted into the half-moon-shaped concave portion.

11. A robot hand comprising:
a plurality of finger sections which grip an object;
a palm section axially movably mounted between the plurality of finger sections to approach the object;
a base on which the plurality of finger sections and the palm section are provided; and
a contact member detachably mounted on the palm section, the contact member selectively contacting the object via axial movement of the palm section, wherein
the contact member is smaller than the palm section,
each of the plurality of finger sections is respectively located at each of four corners of the base, and
each of the plurality of finger sections is configured with a straight part extending from the base and an angled part extending from the straight part.

12. The robot hand according to claim 11,
wherein the contact member has a concave portion which selectively contacts the object.

13. The robot hand according to claim 11, wherein the plurality of finger sections are able to move mutually and horizontally.

14. The robot hand according to claim 11, wherein
a mounting hole is provided in a center of the palm section, and
the contact member is in a plate-like shape with a connection part that connects to the mounting hole.

15. The robot hand according to claim 11, wherein
a cutout is formed at a top surface of the contact member, and
the cutout contacts the object.

16. The robot hand according to claim 11, wherein
a half-moon-shaped concave portion is formed in a top surface of the contact member, and
a half-moon-shaped convex portion of the object is fitted into the half-moon-shaped concave portion.

* * * * *